2,903,484
REACTION OF NAPHTHOLS WITH HYDROGEN SULFIDE

William B. Hardy, Bound Brook, and Jack H. Thelin and Frank Furman, Somerville, N.J., assignors to American Cyanamid Company, New York, N.Y., a corporation of Maine No Drawing. Application October 22, 1957
Serial No. 691,556

15 Claims. (Cl. 260—609)

This invention relates to a process for the preparation of thionaphthols and naphthyl sulfides and disulfides. More specifically, it relates to a process for the preparation of thionaphthols and naphthyl sulfides by the reaction of hydrogen sulfide with a naphthol or its ether or ester at elevated temperatures in the presence of an acid catalyst.

Thionaphthols and dinaphthyl sulfides have been found to be useful as intermediates for various chemicals. For example, thiobetanaphthol is an intermediate in the preparation of a well known thioindogoid vat dye. It has also been found to be of use as a plasticizer in the rubber field. The preparation of thiobetanaphthol on a plant scale has heretofore been carried out from betanaphthylamine through a diazotization and conversion to a xanthate. This process involves a number of steps and requires the handling of the obnoxious xanthate. There is thus a need for an economical, simple, direct one-step method of preparing naphthyl sulfides and thiols from readily available commercial intermediates.

We have found that thionaphthols and dinaphthyl sulfides can be readily prepared by the reaction of hydrogen sulfide with a naphthol, or its ether or ester in the presence of an acid catalyst at elevated temperature. Although aliphatic thiols have been prepared directly from alcohols by the reaction of hydrogen sulfide with the alcohol, it is necessary to carry out this reaction over various catalysts, for example, a thorium catalyst, at very high temperatures. With phenols, the reaction with hydrogen sulfide has required even higher temperatures and extreme pressures in the presence of a metal oxide dehydration catalyst. Temperatures in such preparations run usually in the vicinity of 400° C. and higher. The process of our invention differs from these processes in using much lower temperatures (below 200° C.) and in avoiding the use of high pressures and of the metal oxide catalyst such as the alumina or thoria which have previously been used. Instead the process of our invention proceeds either at atmospheric pressure or under mild pressure (which is used solely to keep a high concentration of hydrogen sulfide in the reaction mixture without excessive use of hydrogen sulfide) at temperatures ranging from 70° to 200° C., in the presence of acid catalysts, which are readily obtained and easily removed from the reaction mixture in the working up stages. It is rather surprising that this reaction proceeds with such ease, since the reaction of sodium disulfide with beta-naphthol proceeds in an entirely different direction, causing the introduction of a mercapto group into the ring in another place without attack upon the naphthol group. Thus, beta-naphthol reacts with sodium sulfide in the presence of sulfur to give 1-mercapto-2-naphthol.

In the process of our invention the naphthol is heated with hydrogen sulfide in the presence of the acid catalyst, under conditions which are chosen to obtain the desired ratio of products, i.e., the thionaphthol or the dinaphthyl monosulfide) depending on the conditions used. The relative ratios of these products are regulated by the control of the mol ratio of reactants, the temperature of the reaction and the use of solvents to control side reactions. The fundamental reaction which occurs can be illustrated by the following equation using beta-naphthol as the illustrating reactant:

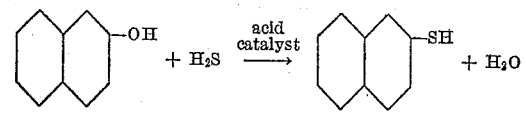

This equation shows the production of thio-beta-naphthol, the product which is the most important result of the process of our invention. However, another reaction can also take place, as illustrated by the following equation:

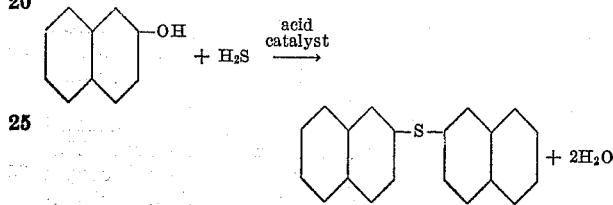

This reaction may take place through the intermediate formation of the thiol, followed by its reaction with more beta-naphthol to form the sulfide. However, it may also take place by direct reaction without the intermediate formation of the thiol and we do not wish to be limited to any theory thereon. It is sufficient to say that these two products are usually obtained in greater or lesser amounts, depending on the conditions and that the conditions can be controlled in order to favor the formation of one or the other of these products. In addition to these two products, there can occur the naphthyl disulfide which in all probability occurs from the mild oxidation of the intermediate thio during isolation of the thiol.

The relative ratio of hydrogen sulfide, naphthol and catalyst, along with the temperature may be so regulated as to result in the exclusive formation of dinaphthyl sulfide or in mainly the production of the thionaphthol. A major effect is that of temperature. Suitable temperatures for the general reaction range from about 70° C. to 200° C., or more. When formation of a sulfide is desired exclusively, temperatures in the upper range from about 100° to 200° C., or decreased amounts of $H_2S$ in contact with the beta-naphthol are employed. Above 100° C. (i.e. about the critical temperature of $H_2S$), the fact that most of the $H_2S$ is in the vapor phase favors the reaction of thiol with unchanged naphthol, forming the sulfide. This effect can be reduced by the presence of a solvent to increase the concentration of $H_2S$ in the reaction zone. At temperatures below 100° C., increasing proportions of the thiol are obtained, although sufficiently high temperature must be used to cause a reaction to take place within a reasonable time. Thus a minimum of about 70° C., is essential. The amount of hydrogen sulfide may also be varied. Large excesses of hydrogen sulfide tend to increase the yield of thiol, while the proportion of sulfide increases with decreasing usages of $H_2S$. A minimum of three moles of hydrogen sulfide per mole of naphthol is desirable to get the thiol, but it is preferred to use much larger ratios, of the order of 30 or 40 moles of hydrogen sulfide per mole of naphthol. The amount of catalyst may also be varied to help control the reaction products obtained. A minimum of about 1 part of catalyst per 20 parts of naphthol by weight is necessary. Larger usages are recommended as a general rule and much larger amounts should be used when large excesses of hydrogen sulfide are being used. The following table illustrates the results obtained by various usages and thus illustrates typical reaction conditions for carrying out the reaction of our invention with emphasis on the various products.

TABLE I

| | | |
|---|---|---|
| 28.8 parts of beta naphthol (0.2 mole)<br>140 parts of hydrogen sulfide (4.0 moles)<br>20 parts of catalyst | Heated 20 hrs. at 180–190° C. | Complete conversion to sulfide. |
| 28.8 parts of beta naphthol (0.2 mole)<br>150 parts of hydrogen sulfide (4.4 moles).<br>10 parts of catalyst | Heated 19 hrs. at 100° C. | 84% yield of crude sulfide. |
| 28.8 parts of beta naphthol (0.2 mole)<br>420 parts of hydrogen sulfide (12.3 moles).<br>12 parts catalyst | Heated 22 hrs. at 90° C. | 33% sulfide, 20% thiol. |
| 28.8 parts of beta naphthol (0.2 mole)<br>180 parts of hydrogen sulfide (10.6 moles).<br>40 parts of catalyst | Heated 22 hrs. at 85° C. | 52% sulfide, 25% thiol. |

Thus, it may be summarized that high temperature favors the formation of sulfide and lower temperature with a greater proportion of hydrogen sulfide and a larger amount of catalyst favors the formation of the thiol.

The proportion of thiol obtained may also be increased by the use of a solvent in the reaction mixture. This apparently serves the purpose of bringing the hydrogen sulfide into closer contact with the naphthol. Solvents such as chloroform, acetic acid and acetic anhydried are especially useful for this purpose. Other solvents which may be used include any other solvents for the reactants which are inert to the hydrogen sulfide and to the acid catalyst as for example aromatic solvents, benzene, toluene, xylene, mono- and dichlorobenzene, carbon disulfide, carbon tetrachloride, methanol, ethanol, and the like. Surfur is an especially good solvent for this use. When sulfur is used as an ingredient of the reaction mixture, the yield of thiol is greatly increased over the sulfide. While a solvent may be used in any proportion, it is not essential to the reaction. To get effective results in the enhancement of the thiol yield about 1 part of solvent per 20 parts of naphthol should be used as a minimum.

The process of our invention can be used to prepare thiols and sulfides from a wide variety of naphthols. Although these specifications discuss the reaction in terms of "naphthols," it must be remembered that the naphthol ethers and esters can be used in place of the naphthol in the reaction, although the more readily available free naphthol is usually the preferred starting material. The naphthalene derivatives which may be used as starting materials in the process of our invention thus comprise the naphthols and their lower aliphatic ethers and esters, such as the alkyl, alkenyl and aralkyl ethers and the mono- and dibasic acid esters of lower aliphatic acids. Examples of these derivatives are 1-naphthol, 2-naphthol, 2-naphthylmethyl ether, 1-naphthylmethyl ether, 2-naphthylethyl ether, 2-naphthylpropyl ether, 1-naphthylbutyl ether, 5-carboxy-2-naphthol, 7-sulfo-2-naphthol, 2-naphthyl allyl ether, 2-naphthyl benzyl ether, 2-naphthyl acetate, 1-naphthyl acetate, 2-naphthyl butyrate, 2-naphthyl oxalate, 2-naphthyl maleate, 2-naphthyl succinate, 2-naphthyl maleate, 2-naphthyl fumarate, 6-bromo-2-naphthol, 1,4-dichloro-2-naphthol, 1-chloro-2-naphthol, 4-chloro-2-naphthol, 1,5-naphthalenediol, 2,6-naphthalenediol, 1,8-naphthalenediol and the like.

When the naphthalene diols are used, the product tends to be a polymeric sulfide, as the second OH reacts with other molecules having only the first OH replaced with SH. Thus, the reaction proceeds as follows:

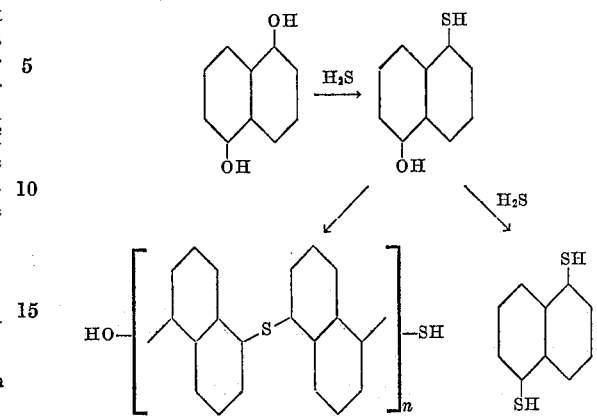

One part of the intermediate which polymerizes by self reaction is insoluble in alkali. The naphthalene dithiol, on the other hand, is extracted with alkali and precipitated as a polymeric disulfide by aeration.

The catalyst for the process of our invention consists of the non-oxidizing mineral acids and the organic sulfonic acids. The most convenient catalysts are the aliphatic and aromatic sulfonic acids such as benzene sulfonic acid, toluene sulfonic acid, both mixed isomers and isolated specific isomers, aliphatic sulfonic acids, such as ethyl sulfonic acid, sulfonated olefins, and the like. Inorganic acids which are not oxidizing acids can be used as for example sulfuric acid, phosphoric acid, polyphosphoric acid, hydrochloric acid, hydrobromic acid, and the like. The minimum usage of catalyst is 1 part of catalyst per 20 parts of naphthol although larger usages are to be preferred especially when larger excesses of hydrogen sulfide are used.

The products from the process may be isolated by various conventional means. Normally, the reaction mixture is first conveniently extracted with water to remove the acid catalyst and an alkaline extraction of the residual solvents will then dissolve the thionaphthol and unreacted naphthol, leaving the sulfides behind. The thiol may then be obtained from the caustic solution by acidification and separated from the unchanged naphthol by conventional methods such as steam stripping or the use of a selective solvent. It may also be separated from unchanged naphthol by oxidation to the disulfide by passing air into the alkaline solution. Disulfide can then be filtered off. This method is by far the most convenient and forms a ready method of determining the amount of free thiol present in the reaction mixtures. The residue from the alkaline extraction contains the sulfide and any disulfide which is formed. The disulfide may be extracted from this by reduction to the mercaptan which is soluble in caustic. This may be carried out by an acid and metal reduction such as zinc and hydrochloric acid or by an alkaline reduction with sodium sulfide or caustic and sodium hydrosulfide. The insoluble monosulfide can then be filtered off and the mercaptan formed from the disulfide can be isolated by conventional means such as acidification or reoxidation to the disulfide. When the free thiol is being isolated, the process should be carried out in an inert atmosphere such as nitrogen in order to prevent air oxidation during the isolation procedure.

Our invention can be further illustrated by the following examples in which parts are by weight unless otherwise specified.

Example 1

MONOSULFIDE PREPARATION

A nickel autoclave is charged with 28.8 g. (0.2 mole) of 2-naphthol and 10 g. (0.05 mole) of p-toluene sulfonic acid hydrate. The autoclave is sealed and cooled in a chloroform-carbon tetrachloride-Dry Ice bath. To the Cold autoclave is then charged 150 g. (4.4 moles) of hydrogen sulfide. The reaction is then carried out by heating the closed autoclave for 19 hours at 100° C. The reaction product is removed from the autoclave and washed with 400 cc. of water at about 80° C. A crude yield of 24 g. of product with a melting point of 138–150° C. is

Example 4

PREPARATION OF 2-NAPHTHYL SULFIDE AND THIO-BETANAPHTHOL AS DI-2-NAPHTHYL DISULFIDE

The procedure described in Example 1 is repeated using various reaction times, temperatures and catalysts. Results are shown in the following table.

| Beta-Naphthol | | $H_2S$ | | Catalyst | Time, Hrs. | Temp., °C. | Percent Yield Sulfide | Percent Yield Thiol [4] | Percent Beta-Naphthol Recovered |
|---|---|---|---|---|---|---|---|---|---|
| Grams | Moles | Grams | Moles | | | | | | |
| 28.8 | 0.2 | 150 | 4.4 | PTSA[1], 10 g | 19 | 100 | 84 Crude, 64 Pure. | | 11 |
| 28.8 | 0.2 | 200 | 5.8 | PTSA, 20 g | 19.5 | 80 | 23 | 24 | 32 |
| 14.4 | 0.1 | 180 | 5.3 | PTSA, 20 g | 22 | 85 | 52.2 | 25 | 10 |
| 28.8 | 0.2 | 420 | 12.3 | Mixed Alkane, $SO_3H$, 12 g | 21.5 | 90 | 33 | 20 | 49 |
| 144 | 1.0 | 340 | 10 | Mixed TSA[2], 200 | 20 | 90 | 82 | 19 | |
| 28.8 | 0.2 | 140 | 4.1 | Mixed TSA, 20 | 20 | 180–190 | 105 | | |
| 28.8 | 0.2 | 280 | 8.2 | Polyphosphoric Acid, 25 g | 21 | 90 | 5 | 6 | 73 |
| 28.8 | 0.2 | 280 | 8.2 | Mixed TSA, 50 g | 21.5 | 65 | 35 | 11 | 42 |
| 28.8 | 0.2 | 280 | 8.2 | Solva Beads[3], 50 g | 21 | 90 | | trace | 63 |
| 28.8 | 0.2 | 280 | 8.2 | none | 21.5 | 93 | | | 87 |

[1] p-Toluene sulfonic acid.
[2] Mixed toluene sulfonic acids.
[3] Silica-alumina catalyst.
[4] Determined as disulfide by air oxidation.

obtained (84% crude yield). The crude product is purified by washing with 2% sodium hydroxide solution and recrystallizing from anhydrous alcohol, giving 18.2 g. of purified 2-naphthyl sulfide, melting at 147–149° C. (recrystallized yield is 64%).

Example 2

PREPARATION OF DI-(2-NAPHTHYL)-SULFIDE AND THIO-BETANAPHTHOL

To an autoclave are charged 28.8 g. (0.2 mole of 2-naphthol), 20 g. (0.12 mole) of p-toluenesulfonic acid hydrate and 200 g. (5.8 moles) of hydrogen sulfide. The mixture is heated at 9½ hours at 80° C., and the reaction product is then washed with 200 cc. of water to remove the acid catalyst. Under nitrogen, the washed product is dissolved in a mixture of 300 cc. of water and 50 cc. of 20% sodium hydroxide. The insoluble residue is removed by filtration, giving 6.5 g. (23% yield) of crude 2-naphthyl sulfide (melting point 130–145° C.). This is purified by recrystallization from alcohol giving product with a melting point at 151° C. By acidification of the alkaline filtrate, 2-thionaphthol precipitates and may be removed by filtration. This is purified by steam stripping to separate it from unreacted beta-naphthol.

Alternatively, and preferably, air is passed through the alkaline filtrate from about 3 hours, precipitating 2-naphthyl disulfide. This is removed by filtration, giving 7.5 g. (24% yield) of 2-naphthyl disulfide (melting point of 138–139° C.). This can then be reduced to the thiol, if desired, by the process of Example 5.

Example 3

PREPARATION OF THIOBETANAPHTHOL AS DI-(1-NAPHTHYL)-DISULFIDE AND DI-1-NAPHTHYL SULFIDE

To an autoclave is charged 28.8 g. (0.2 mole) of 1-naphthol, 50 g. (0.25 mole) of 87% toluene sulfonic acid mixed isomers and 300 g. (8.8 moles) of hydrogen sulfide. The mixture is heated for 21 hours at 90° C. and the thick oil which forms is then washed with 400 parts of water under an atmosphere of nitrogen. The washed product is dissolved in a mixture of 400 cc. of water and 50 cc. of 20% aqueous sodium hydroxide solution. The mixture is extracted with about 400 cc. of benzene. Removal of the benzene from this layer gives 14.5 g. (52% yield) of crude di(1-naphthyl)-sulfide.

Air is bubbled through the aqueous layer from the above extraction for 1½ hours at 70° C., to form crude di(1-naphthyl)-disulfide which is removed by filtration giving 12 g. of solid. By recrystallization of this crude product from 200 cc. of acetic acid, 6.5 g. of 1-naphthyl disulfide with a melting point of 86–87° C. (20% yield) is obtained.

Example 5

REACTION IN SOLVENT—PREPARATION OF THIOL

An autoclave is charged with 28.8 g. (0.2 mole) of 2-naphthol, 50 g. of mixed toluene sulfonic acids, 280 g. (8.2 moles) of hydrogen sulfide and 10 ml. of acetic anhydride. The reaction mixture is heated for 21 hours at 90° C. and the reaction mixture is then washed with 300 cc. of water. The reaction product is then extracted with a mixture of 250 cc. of water and 50 cc. of 20% aqueous sodium hydroxide solution under a nitrogen atmosphere. The alkali insoluble material is removed by filtration and dried, giving 15.5 g. of product.

Air is bubbled through the filtrate for 1 hour at 70° C. The insoluble disulfide which forms is removed by filtration, giving 8 g. of solid with melting point of 134–138° C. (25% yield). By acidifying the filtrate with concentrated hydrochloric acid, unreacted 2-naphthol precipitates and is removed by filtration, giving 5 parts of material with a melting point of 118–120° C. (17% recovery).

To a solution of 10 g. of the alkali insoluble product from the reaction mixture (a) dissolved in 300 cc. of acetic acid is added 5 parts of zinc dust. To the mixture is then added slowly 70 cc. of concentrated hydrochloric acid. After the reaction is complete, the solution is drowned in a mixture of water and ice to a total volume of about 1400 cc. and the insoluble material is removed by filtration. Under nitrogen the product is slurried in a mixture of 200 cc. of water and 50 cc. of 20% aqueous sodium hydroxide solution. Filtration of the insoluble material gives 4.3 g. of insoluble sulfide with a melting point of 137–141° C. (23% yield). Acidification of the filtrate with concentrated hydrochloric acid causes precipitation of 2-thionaphthol. Removal of this by filtration gives 2.9 parts of thiol with a melting point of 77–79° C. (14% yield). The disulfide isolated by aeration of the alkaline extract from the reaction mixture can be similarly reduced to give a total yield of 39% thiobetanaphthol.

Example 6

REACTION IN THE PRESENCE OF SULFUR

The procedure of Example 1 is followed using a mixture of 28.8 g. of betanaphthol, 280 g. of hydrogen sulfide and 50 g. of mixed toluene sulfonic acids, to which 6.4 g. of sulfur is added. The mixture is heated to 87° C., for 20 hours by using the isolation procedure of Example 5 there is obtained 30% recovery of unchanged beta-naphthol and a yield of 44% of theory of thio-beta-naphthol and 13% of theory of dinaphthyl sulfide.

Example 7

USE OF SOLVENT TO INCREASE THIOL

The procedures of Example 6 were followed using in place of the sulfur 50 ml. of chloroform. The mixture is heated to 90° C. for 20.5 hours, and the isolated products included a 33% recovery of unchanged beta-naphthol, 33% yield of thio-beta-naphthol and 11% yield of dinaphthyl sulfide.

Example 8
REACTION USING 2-METHOXY NAPHTHALENE

The procedure of Example 1 is followed using a reaction mixture consisting of 31.6 g. of 2-methoxy naphthalene, 280 g. of hydrogen sulfide and 50 g. of mixed toluene sulfonic acids. When the reaction using this mixture was run for 21 hours at 90° C., a yield of 14% of thiobetanaphthol and 89% sulfide is obtained. When such a reaction mixture is run 20 hours at 130° C., a yield of 27% thiobetanaphthol and 71% dinaphthyl sulfide is obtained.

Example 9
REACTION USING 2-NAPHTHYL ACETATE

The procedure of Example 8 is followed using 37.2 g. of 2-naphthyl acetate in place of the 2-methoxy naphthalene. The reaction is run 21.5 hours at 90° C. There is recovered from the reaction mixture 27% of yield of dinaphthyl sulfide, 42% yield of thiobetanaphthol and 14% recovered beta-naphthol.

Example 10
REACTION USING 2-NAPHTHYLPROPYLETHER

A mixture of 18.6 g. (0.1 mole) 2-naphthyl-propylether, 50 g. toluene sulfonic acids and 280 g. of $H_2S$ is heated in a 1.2 liter nickel autoclave 20½ hours at 90° C. The reaction product is washed with 250 ml. water. The water insoluble material is extracted with a solution of 250 ml. of $H_2O$ and 50 ml. of 20% NaOH, leaving 16 g. of tacky solid. The alkaline filtrate is aerated 2 hours, giving 2-naphthyldisulfide.

Example 11
REACTION USING 6-t-BUTYL-2-NAPHTHOL

A mixture of 17.6 g. (0.1 mole) 6-t-butyl-2-naphthol, 340 g. (10.0 mole) $H_2S$, and 50 g. toluene sulfonic acid mixed isomers is heated 20 hours at 93–98° C. The reaction product is washed with 250 ml. of $H_2O$ and the insoluble material is extracted with a solution of 200 ml. of $H_2O$ and 50 ml. of 20% NaOH. The insoluble crude sulfide is removed by filtration. The filtrate is aerated to give the disulfide which precipitates and is filtered.

Example 12
REACTION USING 7-HYDROXY-2-NAPHTHALENE SULFONIC ACID 7-hydroxy-2-naphthalene sulfonic acid (22.4) and 170 g. of $H_2S$ are heated 21 hours in a nickel autoclave at 95–105° C. The crude sulfide is isolated by salting out the sodium salt after dilution of the reaction mixture with water.

Example 13
REACTION USING 7-CARBOXY-2-NAPHTHOL 7-carboxy-2-naphthol (18.8 g.), of $H_2S$ and 50 g. toluene sulfonic acid are heated 20 hours at 90–105° C. in a nickel autoclave. The reaction product is washed with 250 ml. of $H_2O$ and the insoluble material is extracted with 1000 ml. of 4% NaOH solution. The solution is acidified and the product is removed by filtration. The crude 7-carboxy-2-naphthyl sulfide is purified by recrystallization from xylene.

Example 14
REACTION WITH 6-BROMO-2-NAPHTHOL

A mixture of 22.3 g. of 6-bromo-2-naphthol, 50 g. of toluene sulfonic acid mixed isomers, and 340 g. of $H_2S$ is heated 19½ hours at 90–98° C. in a stainless steel autoclave. After the mixture is washed with water the insoluble material is extracted with a solution of 200 ml. $H_2O$ and 50 ml. of 20% NaOH. The insoluble material is crude sulfide. After the alkaline filtrate is aerated the disulfide is isolated by filtration.

Example 15
REACTION USING 1,5-NAPHTHOLENEDIOL

A mixture of 32 g. 1,5-naphthalenediol, 365 g. $H_2S$, and 50 g. of 87% toluene sulfonic acid mixed isomers is heated 21 hours at 90° C. The tarry reaction product is washed with 600 ml. of water by decantation. The tar is extracted with a mixture of 500 ml. of water and 100 ml. of 20% caustic, leaving a caustic insoluble yellow tar of polymeric sulfide which is insoluble in common solvents. Air is bubbled through the alkaline wash water and the precipitated tacky polydisulfide solid is isolated by filtration. Acidification of the filtrate gives only a trace of insoluble naphthalenediol.

We claim:
1. A process of preparing naphthyl sulfides and naphthalene thiols which comprises heating to above about 70° C., but not above 200° C., a naphthalene derivative selected from the group consisting of oxy, alkoxy and acyloxy naphthalenes with hydrogen sulfide in the presence of at least 1 part of an acid catalyst per 20 parts by weight of said naphthol, the said catalyst being selected from the group consisting of lower alkane, sulfonic acids, monocyclic carbocyclic aryl sulfonic acids and non-oxidizing mineral acids.
2. The process of claim 1 when carried out in a closed system at a superatmospheric pressure.
3. The process of claim 1 carried out at atmospheric pressure by passing the said hydrogen sulfide through the said reaction mixture.
4. The process of claim 2 in which there is included within the reaction mixture at least 1 part by weight of sulfur per 20 parts of the naphthol.
5. The process of claim 2 in which there is included within the said reaction mixture at least 1 part by weight of a solvent of an organic solvent inert to acids and to hydrogen sulfide per 5 parts of said naphthol.
6. The process of claim 5 in which the said acid catalyst is a monocyclic, carbocyclic, aryl sulfonic acid.
7. The process of claim 6 in which the said sulfonic acid catalyst is a toluene sulfonic acid.
8. The process of claim 7 in which the said naphthalene derivative is an alpha-naphthol.
9. The process of claim 7 in which the said naphthalene derivative is a beta-naphthol.
10. The process of claim 9 in which the said beta-naphthol is 2-naphthol.
11. The process of claim 10 in which the temperature of the reaction is held below 100° C.
12. The process of claim 11 in which the usage of hydrogen sulfide is in a mole ratio to the usage of the said beta-naphthol of 40:1.
13. The process of claim 7 in which the said naphthalene derivative is a naphthol ether.
14. The process of claim 7 in which the said naphthalene derivative is a naphthol ester.
15. A process of preparing polymeric sulfides of naphthalene which comprises heating to above about 70° C., but not above 200° C., a naphthalene diol with hydrogen sulfide in the presence of at least 1 part of an acid catalyst per 20 parts by weight of said naphthol, the said catalyst being selected from the group consisting of lower alkane, sulfonic acids, monocyclic carbocyclic aryl sulfonic acids and non-oxidizing mineral acids.

No references cited.